(12) United States Patent
Grant et al.

(10) Patent No.: US 8,360,777 B2
(45) Date of Patent: Jan. 29, 2013

(54) OBSERVER TRAINER SYSTEM

(75) Inventors: Stuart Grant, Ottawa (CA); Tony Ghoman, Mississauga (CA); Don Turner, Unionville (CA)

(73) Assignee: Her Majesty the Queen in Right of Canada as Represented by the Minister of the Department of National Defence, Ottawa, Ontario (CA)

( * ) Notice: Subject to any disclaimer, the term of this patent is extended or adjusted under 35 U.S.C. 154(b) by 590 days.

(21) Appl. No.: 12/292,729

(22) Filed: Nov. 25, 2008

(65) Prior Publication Data

US 2011/0003271 A1 Jan. 6, 2011

(51) Int. Cl.
*G09B 9/02* (2006.01)
*G09B 19/16* (2006.01)

(52) U.S. Cl. ............. 434/29; 434/30; 434/35; 434/38; 434/41; 434/42; 434/69; 434/372

(58) Field of Classification Search .......... 434/29, 434/30, 43, 44, 46, 62, 9, 219, 372, 34, 35, 434/38, 41, 42, 69
See application file for complete search history.

(56) References Cited

U.S. PATENT DOCUMENTS

| | | | | | |
|---|---|---|---|---|---|
| 3,205,303 | A | * | 9/1965 | Bradley | 348/211.4 |
| 3,580,978 | A | * | 5/1971 | Ebeling | 434/43 |
| 3,678,601 | A | * | 7/1972 | McKnight | 434/38 |
| 4,176,468 | A | * | 12/1979 | Marty, Jr. | 434/14 |
| 4,207,688 | A | * | 6/1980 | Derderian et al. | 434/43 |
| 4,303,394 | A | * | 12/1981 | Berke et al. | 434/40 |
| 4,373,169 | A | * | 2/1983 | Burkam | 348/123 |
| 5,015,188 | A | * | 5/1991 | Pellosie et al. | 434/38 |
| 5,137,348 | A | * | 8/1992 | Lacroix | 353/79 |
| 5,341,435 | A | * | 8/1994 | Corbett et al. | 382/103 |

OTHER PUBLICATIONS

J. Clantanoff, "Advanced Program Briefing to Industry", Aircrew Operations & Training, Headquarters Air Mobility Command, Enabling the "Global" in "Global Vigilance, Reach and Power!" symposium.
Bohemia Interactive, "AVRS—Air Crewman Virtual Reality Simulation", online: <http://www.vbs2.com/avrs/>, accessed Nov. 2008.
M. Meador, "Indoor air support—Virtual reality brings close air support training inside", U.S. Army Training and Doctrine Command, Office of the Chief of Public Affairs, online: <http://www.tradoc.army.mil/pao/tnsarchives/june%2006/060806-1.htm>, Jun. 2006, accessed Nov. 2008.
ASD-Network, "Boeing Trains C-17 Loadmasters", Aerospace & Defence Network, online: <http://www.asdnews.com/news-16428/Boeing_Trains_C-17_Loadmasters.htm>, 2008, accessed Nov. 2008.

(Continued)

*Primary Examiner* — Nikolai A Gishnock
*Assistant Examiner* — Sadaruz Zaman
(74) *Attorney, Agent, or Firm* — Brion Raffoul

(57) ABSTRACT

Systems and methods for use in training observers and search and rescue personnel in detecting and identifying visual cues related to potential threats to aircraft and to ground based search and rescue circumstances. A visual display displays a scene generated by a visual scene generator apparatus. A vision limiting device is placed between the trainee and the visual display and the trainee can only see a limited amount of the visual display through a window on the vision limiting device. The limited view of the scene afforded the trainee will force the trainee to move around at various angles to see more of the scene as he normally would in real life.

7 Claims, 4 Drawing Sheets

OTHER PUBLICATIONS

Bohemia Interactive Community, "Loadmaster Virtual Reality Simulation", online: <http://community.bistudio.com/wiki/Loadmaster_Virtual_Reality_Simulation>, 2006, accessed Nov. 2008.

TheFreeLibrary, "Simulator helps aircraft recognize missile threats", National Defence Industrial Association, online: <http://www.thefreelibrary.com/Simulator+helps+aircraft+recognize+missile+threats.-a0128600670>, 2005, accessed Nov. 2008.

Bohemia Interactive Studio, bohemia Interactive to develop a Virtual Battlespace (VBS) Loadmaster Virtual Reality Simulator (LVRS) for the Australian Defence Force, Press Release, Apr. 2006, online: <http://www.virtualbattlespace.com/press_adf_Ivrs.htm>, accessed Nov. 2008.

* cited by examiner

OBSERVER TRAINER SYSTEM

TECHNICAL FIELD

The present invention relates to aircraft simulators for use in training aircraft personnel. More specifically, the present invention relates to systems and methods for use in training non-pilot aircrew such as observers and search and rescue personnel in identifying threats to the aircraft and search and rescue situations.

BACKGROUND OF THE INVENTION

The explosion in computing power within the last 15 years has led to the widespread adoption of computer based simulations for training personnel in various tasks. Simulators can now be found for everything from piloting aircraft to driving cars. However, it has been in the military that simulation based training has found its most widespread use. Military based simulations now train military personnel for duties as diverse as driving a tank, being a door gunner on a helicopter gunship, to flying the latest military aircraft.

While military simulators for various crew positions in aircraft exist, there has been a dearth of simulators for observers and search and rescue (SAR) technicians. Those that do exist do not provide an authentic "out of the window" experience that simulates the limited view that observers and SAR technicians have out of an aircraft window. Such simulators would be useful for training observers in spotting and identifying threats to the aircraft. As well, SAR technicians can be trained in spotting and reporting visual cues that would indicate a crash site or a rescue situation.

Present simulators for this purpose only allow for airborne and air sourced threats (such as missiles). None of the simulators presently available show ground based components of the threats such as personnel with shoulder launched missiles or anti-aircraft artillery pieces. As well, none of the present simulators have the capability to show ground based scenes that would be useful for training SAR technicians.

More importantly, none of the present simulators limit the vision of the trainees of the view out of the window. As is well-known, windows in aircraft, especially military aircraft, tend to be small and are not ideal for sight-seeing or for observing the region surrounding the aircraft. However, it is specifically through these windows that observers have to watch for threats to the aircraft and, when necessary, alert the flight aircrew to the existence and location of these threats. As such, a more authentic and realistic experience would be had from simulators if these simulators provided the trainees with a more limited view of the area around the aircraft. Trainees would then have to move their heads and bodies around to obtain a better view of the area, as they would have to do in real life. Furthermore, the viewing limitation imposed by the trainee's own aircraft also provide a frame of reference that affect the trainee's judgments about the spatiotemporal relationship amongst the trainee, the aircraft, and the objects external to the aircraft.

Some of the current simulators for training observers only provide trainees with a circular view of a scene outside the aircraft. Trainees only see this circular view and, as such, are not required to try and improve their view of the scene as would happen in real life.

Based on the above, there is therefore a need for newer and better simulator systems for training observers and SAR technicians in identifying both ground and air based circumstances which may need attention from the aircrew.

SUMMARY OF INVENTION

The present invention provides systems and methods for use in training observers and search and rescue personnel in detecting and identifying visual cues related to potential threats to aircraft and to ground based search and rescue circumstances. A visual display displays a scene generated by a visual scene generator apparatus. A vision limiting device is placed between the trainee and the visual display and the trainee can only see a limited amount of the visual display through a window on the vision limiting device. The limited view of the scene afforded the trainee will force the trainee to move around at various angles to see more of the scene as he normally would in real life. It will also provide a frame of reference for making spatiotemporal judgments regarding the relationships between the trainee, the trainee's aircraft, and objects external to the aircraft.

In a first aspect, the present invention provides a system for use in training observer personnel in aircraft, the system being for use with visual scene generator apparatus, the system comprising:

a visual display for displaying a scene generated by said visual scene generator apparatus;

a vision limiting device for use by said observer personnel, said vision limiting device being constructed and arranged between said personnel and said visual display so as to limit said observer personnel's view of said visual display such that said observer personnel is able to see all of said scene only by moving said personnel's head or body.

In a second aspect, the present invention provides a method for training observer personnel in aircraft, the method comprising:

a) providing a visual display for displaying a scene generated by a visual scene generator apparatus;

b) providing a vision limiting device for use by said observer personnel, said vision limiting device being constructed and arranged between said personnel and said visual display so as to limit said observer personnel's view of said visual display such that said observer personnel is able to see all of said scene only by moving said personnel's head or body;

c) displaying a scene on said visual display, said scene being a dynamic scene depicting a view outside of an aircraft in flight, said scene including a ground view as seen from said aircraft.

BRIEF DESCRIPTION OF THE DRAWINGS

The invention will be described with reference to the accompanying drawings, wherein.

DETAILED DESCRIPTION OF THE INVENTION

Figure 1:
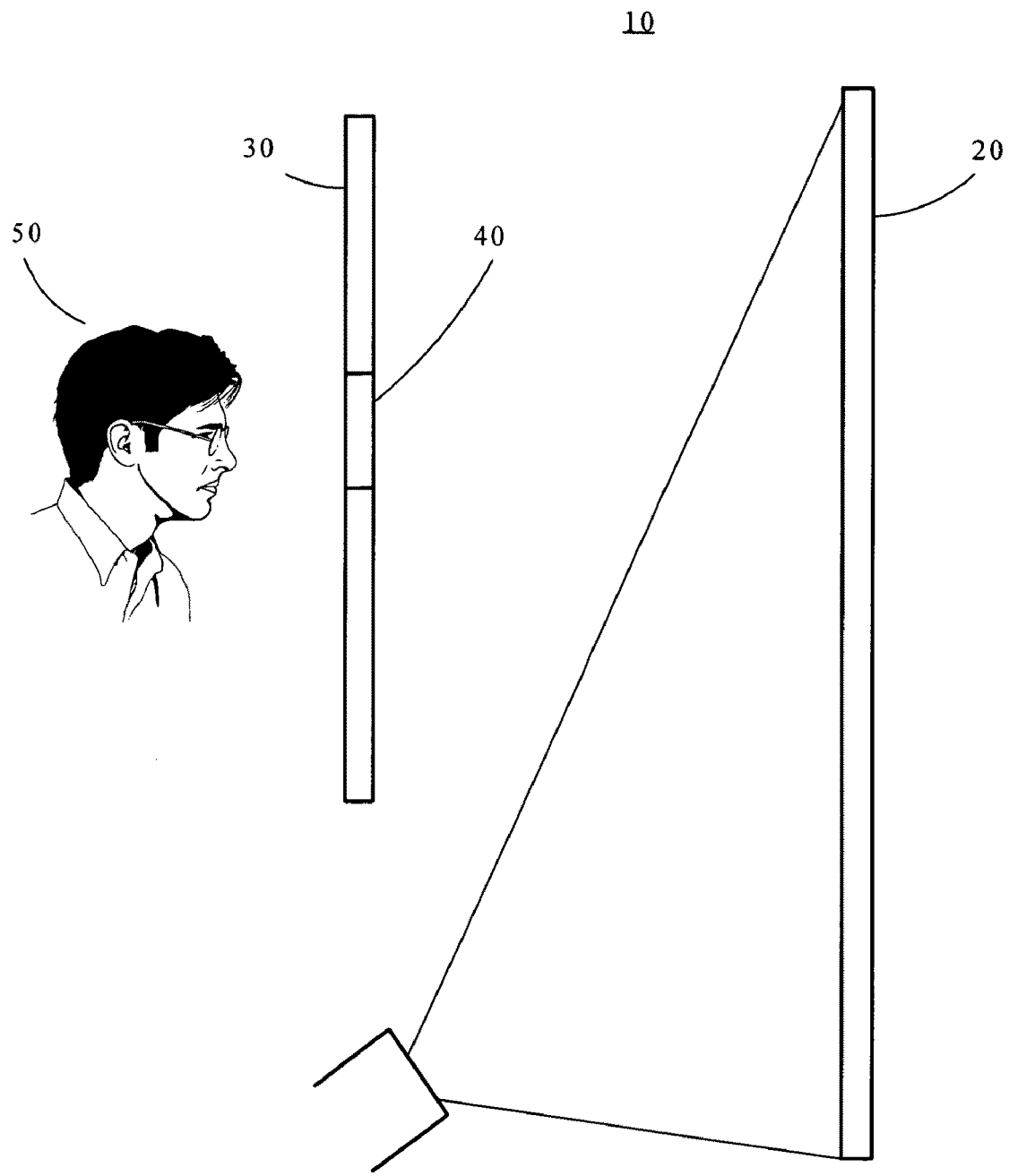
FIG. 1 is a schematic side view of one embodiment of the invention.

Referring to FIG. 1, a side view diagram of a training simulator for use with training observers and SAR technicians is illustrated. The system 10 comprises a video display unit 20, a vision limiting device 30 with a window 40. The user/personnel 50 to be trained observes a scene being shown on the video unit 20 through the window 40. The vision limiting device 30 is positioned between the personnel 50 and the video display 20 and is apart from the display 20. The device 30 prevents the personnel 50 from seeing the complete scene being presented on the display 20 except for what the personnel 50 can see through the window 40. This will, therefore, force the personnel 50 to, if he wants to see the whole scene, extend his neck, move his head (and possibly his body) around to obtain a better view of the scene. The personnel 50 may be, depending on the circumstances inside the aircraft for which he is training for, standing or sitting while observing the scene through the window 40.

The video display 20 may be a flat or curved screen video display, a projector and screen assembly, a cathode ray tube (CRT) device, a liquid crystal display (LCD) screen, a plasma screen, or any other device suitable for displaying video displays from such signals as a TV signal, a computer video output, or any similar signals.

The vision limiting device 30 may be any device which prevents the personnel 50 from seeing the scene on the display 20 except for what the personnel 50 can see through the window 40. As such, the device 30 may be an inflatable screen with a plastic window, a replica or reasonable facsimile of an aircraft door or airframe with a window, or even a suitable wall with a window. Of course, it would be preferable, for training and simulation purposes, for the device 30 to have a window similar in size and nature to an aircraft window. As well, it would be preferable if the personnel 50 would not be able to see the edges of the display 20 through the window as this may ruin the illusion of being inside an aircraft and looking out through one of the aircraft's windows. The device 30 may therefore be a shield or shroud which covers the periphery of the display 20, thereby limiting the view seen by the personnel 50 to only what is inside the shroud or shield (namely the screen of the display 20).

To provide the scene (preferably a dynamic scene) portrayed on the display 20, a controller 60 is coupled to the display 20. The controller 60 may be a computer with suitable software for simulating scenes outside of an aircraft in flight. Preferably, the software is based on a suitable flight simulator so as to provide proper air and ground visual artefacts in the scene presented to the personnel 50. The controller 60 has a visual scene generator 65 which actually generates the scenes viewed by the personnel 50.

The controller, operated by suitably trained personnel, should be capable of providing dynamic scenes such as those encountered by actual aircraft when flying missions. As an example, the controller should be capable of showing contrails (or vapor trails) from missiles, other aircraft (both fixed wing and helicopters), and other possible airborne threats. Similarly, ground based threats, such as anti-aircraft batteries, missile batteries, artillery, military formations, tracer fire from ground based threats, and ground vehicles should, preferably, also be viewable in the dynamic display. These and other ground and air visual artefacts can be used to train personnel 50 in not only identifying threats but also potential threats to the aircraft. Furthermore, these artefacts can be used to train personnel in judging their spatiotemporal relationship with the personnel's aircraft. As an example, these artefacts can be used to train the personnel in assessing distances, time to impact, altitude, direction, etc. of these artefacts relative to the personnel's simulated aircraft. As a further example, if the personnel sees an incoming simulated missile, the personnel can be trained to assess if the missile will make impact with aircraft and, if so, how much time before the impact.

It should, however, be noted that the controller should also be capable of displaying non-military visual cues useful for training SAR technicians. As such, the controller should be capable of showing crash sites, forest fires, and other natural disasters. Furthermore, the controller should be capable of showing these artefacts and visual cues (both military and non-military) as they are seen from an aircraft flying at various altitudes. With such a system and such a controller, SAR technicians can be trained to spot telltale signs of crash sites, burning wreckage, sinking ships, smoke signals, and other search and rescue situations. Similarly, military personnel can be trained to recognize and spot telltale signs of incoming threats or potential threats to the aircraft using this system and controller. As explained above, SAR technicians can also be trained, using the system, to assess spatiotemporal relationships between artefacts they see and the simulated aircraft. SAR technicians can therefore be trained to, as an example, assess how far a simulated crash site is from the aircraft or roughly how long it will take the aircraft will take to reach such a simulated crash site.

Figure 2:
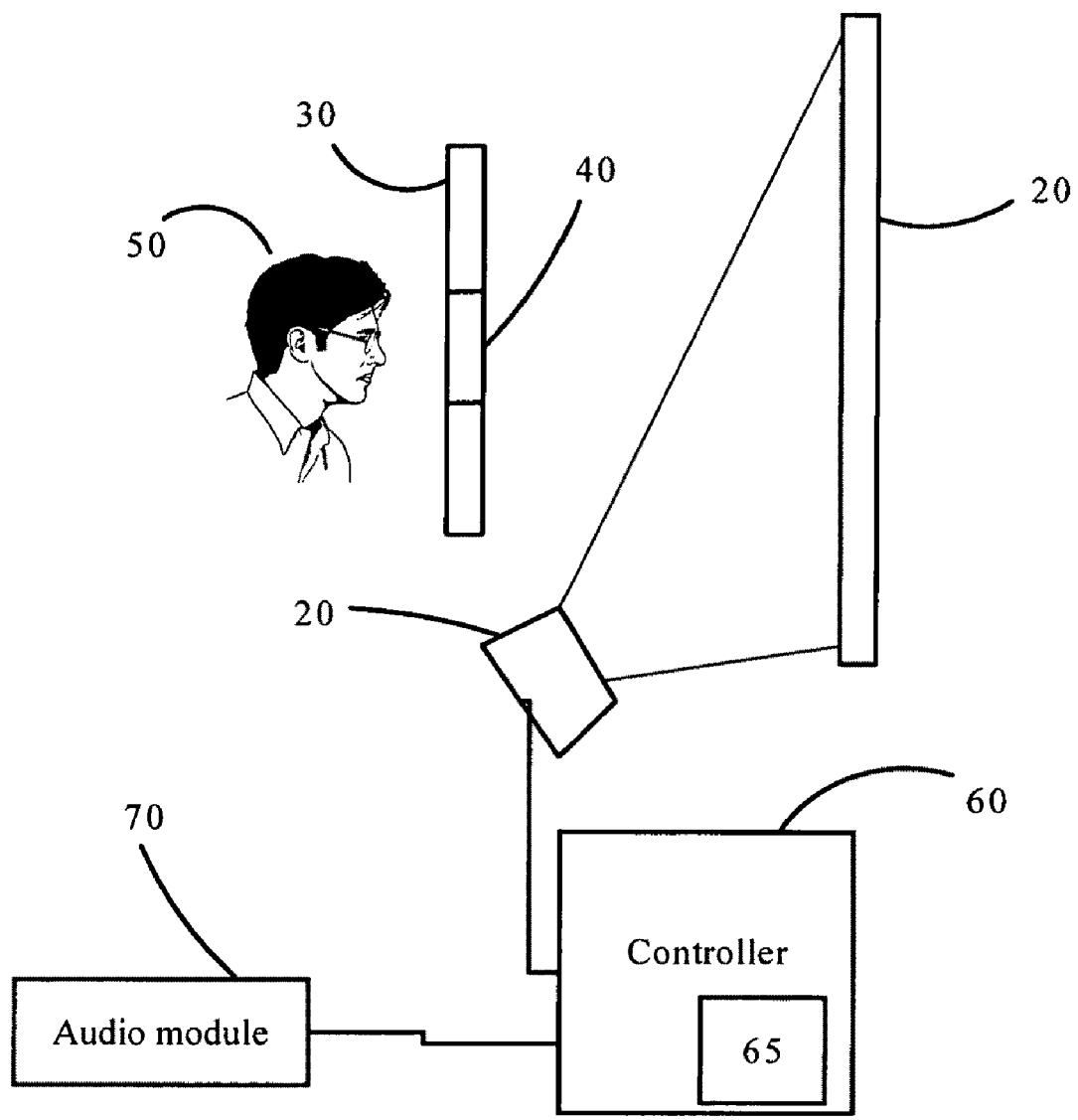
FIG. 2 is a schematic view of one variant of the invention which uses an audio module.

For further authenticity to the simulation being provided to the personnel 50 being trained, an audio module may also be coupled to the controller 60 (see FIG. 2). The audio module 70 would provide the personnel 50 being trained with audio input from other observers in the simulated aircraft or from the flight aircrew. Similarly, the personnel 50 being trained may also provide audio feedback to the other observers or the flight aircrew regarding what he sees through the window. The audio provided to the personnel 50 may be recorded audio samples of real-life chatter from actual aircraft or be pre-recorded simulated responses. Either way, the audio may come from the controller 60. Thus, if a simulated incoming missile threat is observed by the personnel 50, he can indicate the presence of the threat by communicating with a simulated flight aircrew via the audio module. The controller, upon receiving this input from the personnel, can then adjust the aircraft simulation to mimic the view out of an aircraft that is taking evasive manoeuvres. The view seen by the personnel thus changes accordingly and the personnel can then visually track the incoming virtual missile threat and provide guidance as to whether the measures taken by the virtual flight aircrew have been successful or not.

Similar to the above, as an example, an SAR technician can spot a potential crash site and indicate this to the virtual flight aircrew through the audio module. The controller can then adjust the simulation to mimic an aircraft manoeuvring for a closer look at the potential crash site. The view seen by the personnel thus similarly changes as the aircraft may lose some altitude and may adjust its heading accordingly. The SAR technician being trained can thus visually verify if what he saw was a virtual crash site or not.

It should be noted that while pre-recorded audio may be used to provide authenticity to the training experience for personnel 50 as detailed above, a more authentic training experience can be had by providing live audio to the personnel 50. This can be done by networking the system 10 with other training modules 80A, 80B, and 80C being used by other personnel (see FIG. 3). By doing this, other training personnel can have different views of the same event (assuming all the personnel are supposed to be on the same aircraft) and they can be trained to track threats and other visual cues as a team.

Figure 3:
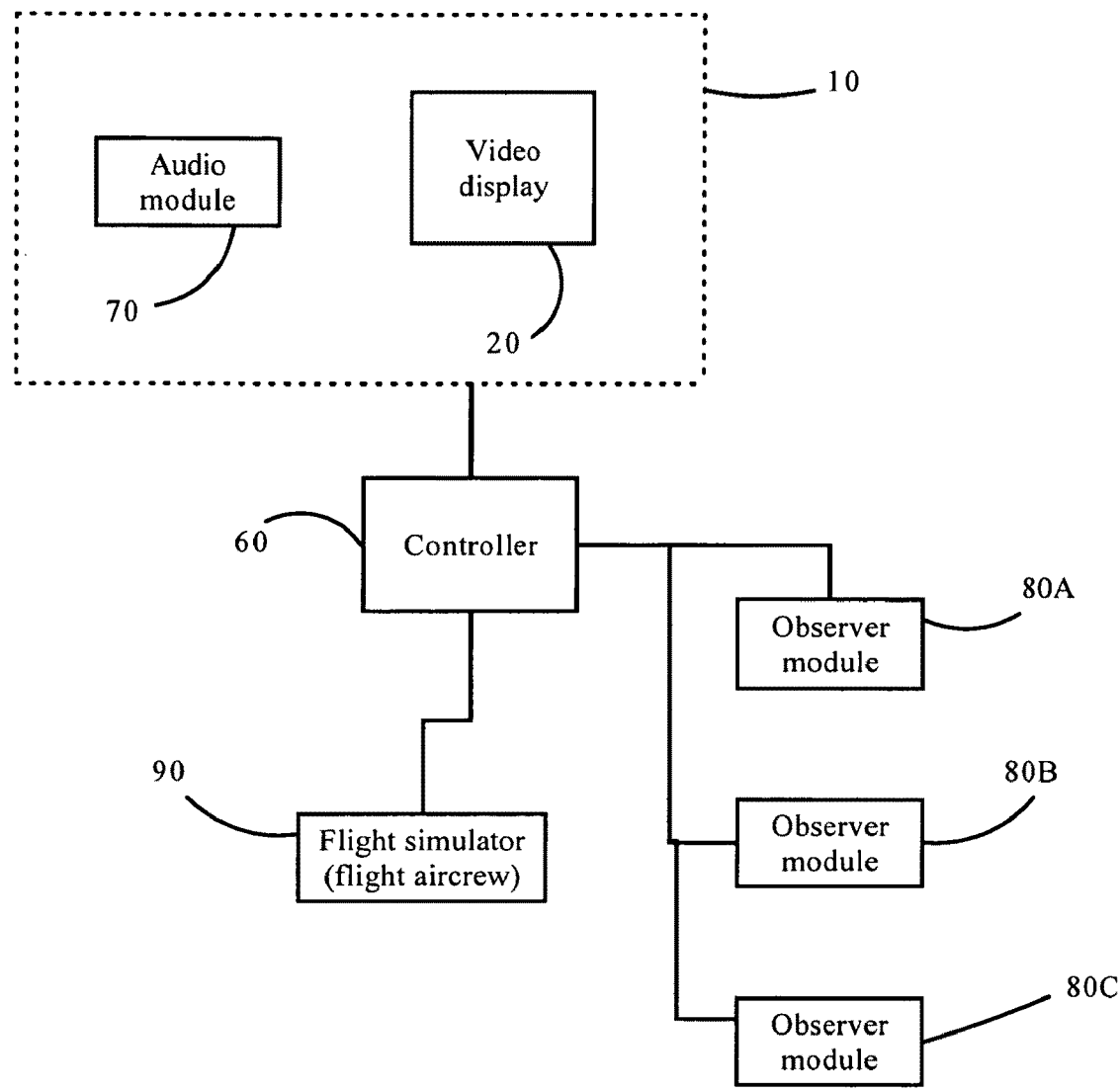
FIG. 3 is a block diagram of another variant of the invention in which multiple instances of the invention are networked together for team training.

As noted above, it is preferable that the controller be used in conjunction with a flight simulator to provide realistic views of the area around the aircraft. For adding yet more authenticity, a flight simulator module, controlled by a real flight aircrew (either in training or not) can be used with the networked configuration as shown in FIG. 3. The configuration can be configured so that flight control adjustments by the flight aircrew are reflected by the views seen by the personnel. Thus, if the flight aircrew banks the simulated aircraft to the left, the personnel would see a corresponding change in the scene that they were viewing. Using this example, trainees who were looking outside the virtual right side of the aircraft and who were visually tracking a ground based target would see the target disappear underneath the virtual aircraft. Thus, to keep this target in view, these trainees, when using the system 10, would have to angle their heads accordingly as the virtual aircraft banks to the left.

The networking between the various personnel using the system may be carried further by also networking the audio between the various personnel. Thus, observer personnel and/or SAR technician can be in constant communication with each other and with the flight aircrew. Based on the feedback from the observers, the flight aircrew can adjust the flight of the virtual aircraft to avoid virtual threats, obtain a better view of a potential search and rescue situation, or otherwise react to the input from the observers. As noted above, any adjustments to the flight by the aircrew (and/or the operator of the controller) is reflected in the views seen by the personnel.

In one implementation of the invention, the visual display was a 2 meter fabric dome immersive display from Immersive Display Solutions of Atlanta Ga. Other immersive displays and, in fact, other types of displays may also be used. For this implementation, the dome may be inflatable or rigid (such as the immersive display marketed by Immersive Display UK located in Essex, UK). In some implementations, the vision limiting device is a canopy deployed over the immersive display. As noted above, the canopy has a window that has similar size and shape to the windows of the aircraft being simulated. For the visual scene generator (referred to above as the controller but may be considered as part of a larger controller), the implementation used a number of dual core processors (with sufficient support circuitry) running in parallel.

For the above noted implementation, various types of software may be used to generate the scenes viewed by the training personnel. In this implementation, the software product marketed under the name Vega Prime by Presagis (based out of Montreal, Quebec, Canada) with the Vega Prime FX and Vega Prime Marine was used as the image generator software rendering tool.

Other software may also be used to generate the scenes. Software developed by Bohemia Interactive (such the package marketed as Virtual Battlespace and Virtual Battlespace 2) may be modified to provide the various scenes used by the above noted system. Military grade aircraft simulation software may also be adjusted to provide the various scenes shown to the personnel by the visual display.

Figure 4:
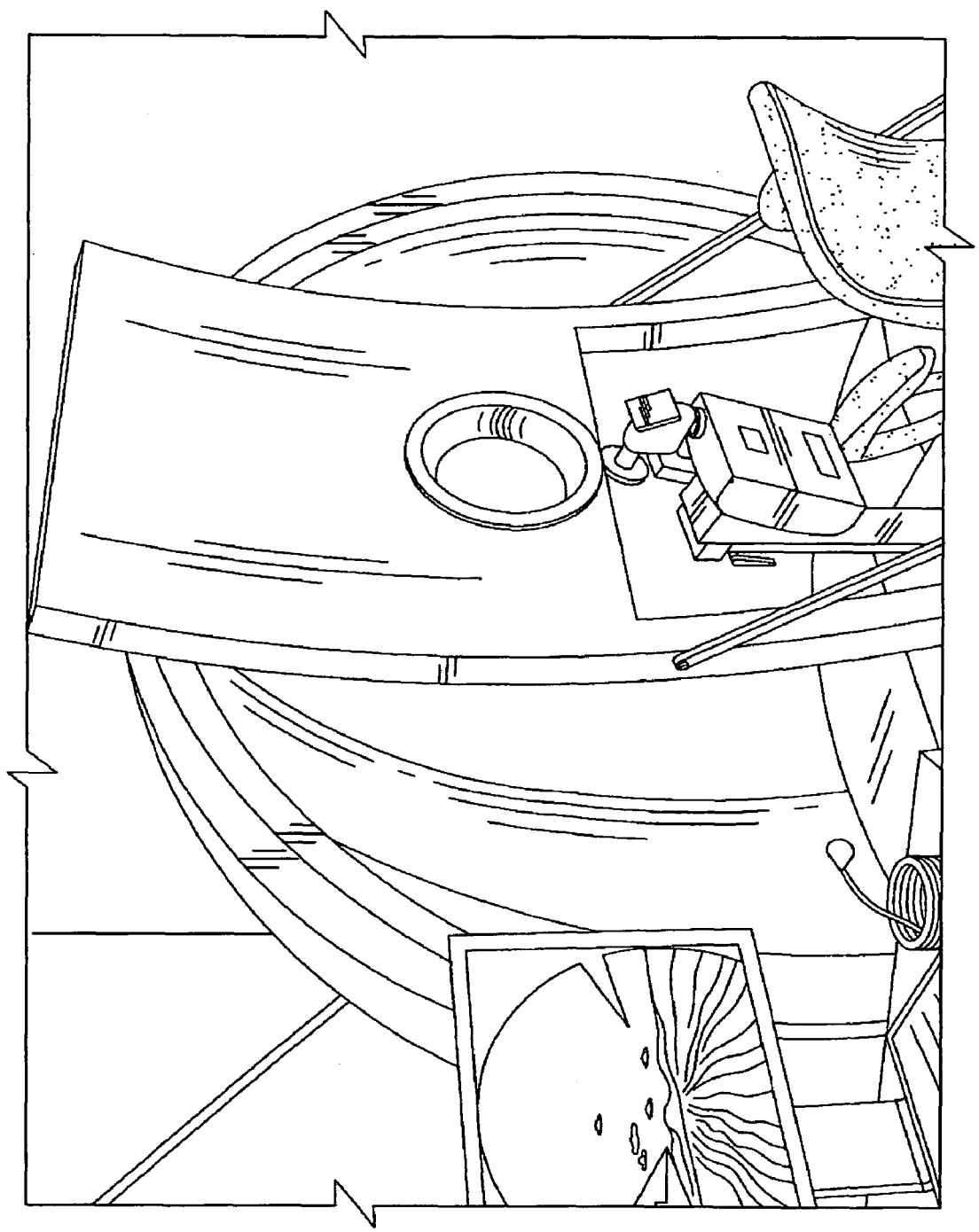
FIG. 4 is a diagram illustrating one implementation of one aspect of the invention.

Referring to FIG. 4, an image of the above noted implementation of the invention, specifically designed to simulate a C-130 Hercules aircraft, is shown. As can be seen from the image, a circular window is provided on a vision limiting device designed to simulate a door or an airframe of a C-130 Hercules aircraft. The display is a dome immersive display as described above. A monitor to the right of the image in FIG. 4 shows an image of what would be projected on to the dome and which would be seen by the personnel seated in front of the window.

It should be noted that while the above noted implementation of the invention was specifically tasked to train personnel for the observer position in C-130 aircraft, other aircraft which have observers and/or which have the capability to have observers or SAR technicians as aircrew may be simulated as well.

Having thus described the invention, what is claimed as new and secured by Letters Patent is:

1. A method for training observer personnel in aircraft, the method comprising:
   a) providing a visual display for displaying a scene generated by a visual scene generator apparatus;
   b) providing a vision limiting device for use by said observer personnel, said vision limiting device being placed between said personnel and said visual display, said personnel's only view of said scene being through said vision limiting device, said vision limiting device being constructed and arranged such that said vision limiting device prevents said personnel from seeing a complete view of said scene except for what said personnel can see through said device such that said personnel must move his or her head or body for a more complete view of said scene;
   c) displaying a scene on said visual display, said scene being a dynamic scene depicting a view outside of an aircraft in flight, said scene including a ground view as seen from said aircraft
   wherein said vision limiting device is an aircraft door with a window and said system is for training observer personnel in assessing spatiotemporal relationships between artefacts viewed out of said window and said aircraft in flight.

2. A method according to claim 1 wherein said scene includes a depiction of at least one airborne threat to said aircraft.

3. A method according to claim 1 wherein said scene includes a depiction of at least one ground sourced threat to said aircraft.

4. A method according to claim 1 wherein said scene includes a depiction of ground circumstances useful for training search and rescue personnel.

5. A method according to claim 1 further including the step of providing audio communications to said observer personnel, said audio communications being with other aircrew being trained.

6. A method according to claim 1 further including the step of providing audio communications to said observer personnel, said audio communications being with flight personnel piloting said aircraft being simulated.

7. A method according to claim 6 further including the step of adjusting said scene in response to commands provided by said flight personnel.

* * * * *